US008781672B2

(12) United States Patent
Singh et al.

(10) Patent No.: US 8,781,672 B2
(45) Date of Patent: Jul. 15, 2014

(54) SYSTEM AND METHOD FOR IMPORTANCE SAMPLING BASED TIME-DEPENDENT RELIABILITY PREDICTION

(75) Inventors: Amandeep Singh, Troy, MI (US); Efstratios Nikolaidis, Ann Arbor, MI (US); Zissimos P. Mourelatos, Grosse Pointe Shores, MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 491 days.

(21) Appl. No.: 13/198,337

(22) Filed: Aug. 4, 2011

(65) Prior Publication Data

US 2013/0035822 A1 Feb. 7, 2013

(51) Int. Cl.
*G06F 7/00* (2006.01)
*G07C 5/08* (2006.01)

(52) U.S. Cl.
CPC .................................... *G07C 5/0841* (2013.01)
USPC ....... 701/29.9; 701/29.1; 701/29.8; 701/30.3; 701/30.4; 701/30.5; 701/31.7; 701/31.9; 701/33.6

(58) Field of Classification Search
USPC ........... 701/29.1, 29.7, 29.8, 29.9, 30.3, 30.4, 701/30.5, 31.3, 31.7, 31.9, 33.6; 703/22
See application file for complete search history.

(56) References Cited

U.S. PATENT DOCUMENTS 5,940,810 A * 8/1999 Traub et al. ................. 705/36 R
6,353,767 B1 * 3/2002 Wakeman et al. .............. 700/91
6,571,202 B1 5/2003 Loman et al.
7,006,947 B2 * 2/2006 Tryon et al. .................... 702/183
7,031,935 B1 * 4/2006 Chhabra et al. .............. 705/36 T
7,805,390 B2 * 9/2010 Friedlander et al. ............ 706/47
7,813,438 B2 * 10/2010 Farhang-Boroujeny et al. ............................. 375/262
2003/0004679 A1 * 1/2003 Tryon et al. ................... 702/182
2005/0288918 A1 * 12/2005 Chen et al. ...................... 703/22
2008/0015827 A1 * 1/2008 Tryon et al. ........................ 703/2
2008/0249743 A1 * 10/2008 Hirohata et al. .............. 702/181
2010/0094611 A1 * 4/2010 Sankaranarayanan et al. . 703/22
2010/0169051 A1 * 7/2010 Peng et al. .................... 702/189

OTHER PUBLICATIONS

"The ARIMA Procedure," Jun. 25, 2004 (via Wayback Machine), SAS OnlineDoc, http://web.archive.org/web/20040515000000*/http://www.okstate.edu/sas/v8/saspdf/ets/chap7.pdf.*
Borner et al., "Model based fault detection of vehicle suspension and hydraulic brake systems," 2002, Mechatronics.*
Zhang et al., "An efficient re-analysis methodology for probabilistic vibration of large-scale structures," May 2009, Journal of Mechanical Design.*
Dogan, "Confidence Interval Estimation in System Dynamic Models: Boostrapping vs. Likelihood Ratio Method," 2004, MIT Sloan School of Management.*

(Continued)

*Primary Examiner* — Thomas G Black
*Assistant Examiner* — Sara Nelson
(74) *Attorney, Agent, or Firm* — David L. Kuhn; Thomas W. Saur; Luis Miguel Acosta

(57) ABSTRACT

A system and a method of generating a reliability prediction for components of a vehicle. The system and the method include implementing importance sampling in dynamic vehicle systems when the vehicle is subjected to time-dependent random terrain input. Alternatively, simulation data may be implemented. The system and the method include determining a decorrelation length, scaling up the standard deviation of white noise, and calculation of a likelihood ratio.

6 Claims, 11 Drawing Sheets

(56) References Cited

OTHER PUBLICATIONS

Danforth, "Variance-Covariance Matrix," Jun. 2009.*
Andrieu-Renaud et al., "The PHI2 method: a way to compute time-variant reliability," 2003, Science Direct.*
Stoica et al., "Asymptotic properties of the high-order Yule-Walker estimates of sinusoidal frequencies," 1989, IEEE.*
Bayer, V., and Bucher, C., "Importance Sampling for First Passage Problems of Non-Linear Structures," Probabilistic Engineering Mechanics, 14, pp. 27-32, 1999.
Andrieu-Renaud, C., Sudret, B., and Lemaire, M., "The PHI2 Method: A Way to Compute Time-variant Reliability," Reliability Engineering and Safety System, 84(1), pp. 75-86,2004.
Mori, Y., and Ellingwood, B., "Time-Dependent System Reliability Analysis by Adaptive Importance Sampling," Elsevier Science Publishers B.V., pp. 59-73, 1993.
Hecht, M., and Hecht, H., "Use of Importance Sampling and Related Techniques to Measure Very High Reliability Software," IEEE, 14 Pages, 2000.
Durairaj, G., Koren, I., Krishna, C.M., "Importance Sampling to Evaluate Real-Time System Reliability: A Case Study," Univ. of Massachusetts, pp. 1-17, 2001.
Zhang, Nikolaidis, & Mourelatos, "An Efficient Re-Analysis Methodology for Probabilistic Vibration of Large-Scale Structures," Journal of Mech. Design, pp. 1-13, vol. 131, 2009.

* cited by examiner

SYSTEM AND METHOD FOR IMPORTANCE SAMPLING BASED TIME-DEPENDENT RELIABILITY PREDICTION

GOVERNMENT INTEREST

The invention described here may be made, used and licensed by and for the U.S. Government for governmental purposes without paying royalty to us.

BACKGROUND OF THE INVENTION

1. Field of the Invention

The present invention generally relates to a system and method for importance sampling based time-dependent reliability prediction.

2. Background Art

Conventional systems and methods for long term (i.e., time-dependent) reliability prediction are typically inaccurate in some examples and computationally intensive, hence expensive, in other examples. In particular, accurate, rapid, inexpensive vehicle component long term reliability prediction can be especially problematic where the components degrade due to time-dependent effects such as multiple exposures to relatively small terrain and load related forces and corrosive environment effects.

Thus, there exists a need and an opportunity for an improved system and method for long term vehicle component reliability prediction. Such an improved system and method may overcome one or more of the deficiencies of the conventional approaches.

SUMMARY OF THE INVENTION

Accordingly, the present invention may provide a system and method for importance sampling based time-dependent reliability prediction.

According to the present invention, a system for generating a reliability prediction for components of a vehicle is generally provided. The system includes:

sensors electrically coupled to a data acquisition system for obtaining data related to the components from a random input process; and a data analysis system, wherein the data analysis system comprises a computer processor electrically coupled to a computer memory, and the computer memory includes programming for the computer processor to perform the steps of:

(A) retrievably storing the data in the computer memory;

(B) characterizing the random input process;

(C) determining a decorrelation length;

(D) scaling up the standard deviation of a white noise level of the data;

(E) computing a covariance matrix of an original time series and of a scaled time series;

(F) beginning evaluation of a sample function;

(G) generating a scaled up sample function to produce an inflated domain;

(H) performing at least one of running a test or running a simulation model of the vehicle;

(I) computing a scaled vehicle response at a series of time steps until a first occurrence of a failure;

(J) when the failure occurs, computing a likelihood ratio based on an original joint probability density function and a sampling joint probability density function;

(K) determining whether an estimated vehicle response is equal to or greater than a threshold response, and when the estimated vehicle response is not equal to or greater than the threshold response, incrementing the time step and returning to the step (I), and when the estimated vehicle response is equal to or greater than the threshold response;

(L) incrementing a failure counter by 1 at the current time step;

(M) determining whether the number of the sample functions has exceeded a target number of sample functions and when the target number of sample functions is not exceeded, incrementing to the next sample evaluation and returning to the step (G), and when the target number of sample functions is exceeded;

(N) computing a safe number of the sample functions;

(O) calculating a failure rate estimation; and (P) determining whether the failure rate estimation variance exceeds a predetermined value and the scale factor is greater than a predetermined amount, and when the failure rate estimation variance exceeds a predetermined estimation variance value and the scale factor is greater than a predetermined amount, reducing the scale factor by a predetermined amount and returning to the step (D), and when the failure rate estimation variance exceeds the predetermined estimation variance value;

(Q) providing the reliability prediction to a user, and ending the method.

The system wherein, the step of characterizing the random input process further comprises time series modeling of the data.

The system wherein, the step of characterizing the random input process further comprises generating an autoregressive integrated moving average (ARIMA) model of the data.

The system wherein, the step of characterizing the random input process further comprises estimating feedback parameters of the data.

The system wherein, the step of characterizing the random input process further comprises estimating a standard deviation of the white noise in the data.

The system wherein, a scaling factor in the range of 1.2 to 1.5 is implemented to inflate the standard deviation of the white noise level of the data.

The system wherein, the covariance matrix is computed via Yule-Walker equations.

The system further comprising the step of storing the covariance matrix in the computer memory.

The system further comprising the step of computing a likelihood ratio.

The system further comprising the step of adding the likelihood ratio to a previous sum at the same time step.

Also according to the present invention, a method of generating a reliability prediction for components of a vehicle is provided. The method including the steps of:

(A) obtaining data related to the components from a random input process and retrievably storing the data in a computer memory, and via programming stored in the computer memory implementing a computer processor to perform the steps of:

(B) characterizing the random input process;

(C) determining a decorrelation length;

(D) scaling up the standard deviation of a white noise level of the data;

(E) computing a covariance matrix of an original time series and of a scaled time series;

(F) beginning evaluation of a sample function;

(G) generating a scaled up sample function to produce an inflated domain;

(H) performing at least one of running a test or running a simulation model of the vehicle;

(I) computing a scaled vehicle response at a series of time steps until a first occurrence of a failure;

(J) when the failure occurs, computing a likelihood ratio based on an original joint probability density function and a sampling joint probability density function;

(K) determining whether an estimated vehicle response is equal to or greater than a threshold response, and when the estimated vehicle response is not equal to or greater than the threshold response, incrementing the time step and returning to the step (I), and when the estimated vehicle response is equal to or greater than the threshold response;

(L) incrementing a failure counter by 1 at the current time step;

(M) determining whether the number of the sample functions has exceeded a target number of sample functions and when the target number of sample functions is not exceeded, incrementing to the next sample evaluation and returning to the step (G), and when the target number of sample functions is exceeded;

(N) computing a safe number of the sample functions;

(O) calculating a failure rate estimation; and (P) determining whether the failure rate estimation variance exceeds a predetermined value and the scale factor is greater than a predetermined amount, and when the failure rate estimation variance exceeds a predetermined estimation variance value and the scale factor is greater than a predetermined amount, reducing the scale factor by a predetermined amount and returning to the step (D), and when the failure rate estimation variance exceeds the predetermined estimation variance value;

(Q) providing the reliability prediction to a user, and ending the method.

The method wherein, the step of characterizing the random input process further comprises time series modeling of the data.

The method wherein, the step of characterizing the random input process further comprises generating an autoregressive integrated moving average (ARIMA) model of the data.

The method wherein, the step of characterizing the random input process further comprises estimating feedback parameters of the data.

The method wherein, the step of characterizing the random input process further comprises estimating a standard deviation of the white noise in the data.

The method wherein, a scaling factor in the range of 1.2 to 1.5 is implemented to inflate the standard deviation of the white noise level of the data.

The method wherein, the covariance matrix is computed via Yule-Walker equations.

The method further comprising the step of storing the covariance matrix in the computer memory.

The method further comprising the step of computing a likelihood ratio.

The method further comprising the step of adding the likelihood ratio to a previous sum at the same time step.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Definitions and Terminology

Figure 1:
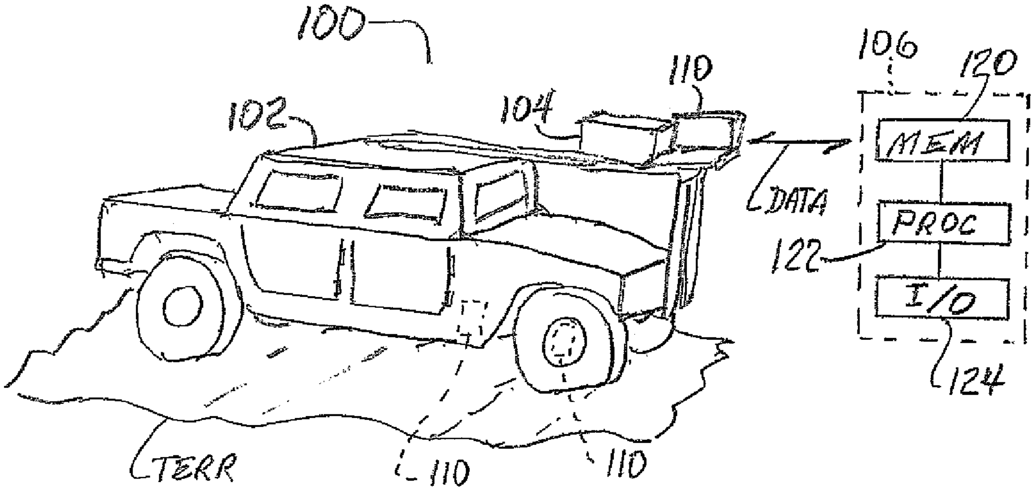
FIG. 1 is a diagram of a system of the present invention.

The following definitions and terminology are applied as understood by one skilled in the appropriate art.

The singular forms such as "a," "an," and "the" include plural references unless the context clearly indicates otherwise. For example, reference to "a material" includes reference to one or more of such materials, and "an element" includes reference to one or more of such elements.

As used herein, "substantial" and "about", when used in reference to a quantity or amount of a material, characteristic, parameter, and the like, refer to an amount that is sufficient to provide an effect that the material or characteristic was intended to provide as understood by one skilled in the art. The amount of variation generally depends on the specific implementation. Similarly, "substantially free of" or the like refers to the lack of an identified composition, characteristic, or property. Particularly, assemblies that are identified as being "substantially free of" are either completely absent of the characteristic, or the characteristic is present only in values which are small enough that no meaningful effect on the desired results is generated.

A plurality of items, structural elements, compositional elements, materials, subassemblies, and the like may be presented in a common list or table for convenience. However, these lists or tables should be construed as though each member of the list is individually identified as a separate and unique member. As such, no individual member of such list should be considered a de facto equivalent of any other member of the same list solely based on the presentation in a common group so specifically described.

Concentrations, values, dimensions, amounts, and other quantitative data may be presented herein in a range format. One skilled in the art will understand that such range format is used for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a size range of about 1 dimensional unit to about 100 dimensional units should be interpreted to include not only the explicitly recited limits, but also to include individual sizes such as 2 dimensional units, 3 dimensional units, 10 dimensional units, and the like; and sub-ranges such as 10 dimensional units to 50 dimensional units, 20 dimensional units to 100 dimensional units, and the like.

With reference to the Figures, the preferred embodiments of the present invention will now be described in detail. Generally, the present invention provides an improved system and an improved method for importance sampling based time-dependent reliability prediction. An example of reliability prediction for components of a vehicle that is operated on a terrain providing a random input to the vehicle is discussed below as exemplary of the present invention; however, the present invention is not limited to the example discussed. One of ordinary skill in the relevant art is assumed to have a working knowledge of conventional statistical mathematical concepts, applications, and analysis techniques, as used herein, in particular, conventional reliability computations, autoregressive integrated moving average (ARIMA) modeling, Monte Carlo simulation, importance sampling, Yule-Walker equations, and the like.

Referring to FIG. 1, a diagram illustrating an example of an importance sampling based time-dependent reliability prediction system (e.g., apparatus, etc.) 100 is shown. The system 100 generally comprises a vehicle 102, a data acquisition system 104, and a data analysis system 106. The vehicle 102 may be operated on a terrain, TERR, to generate an example of data, DATA, that may be obtained (i.e., acquired, measured, etc.) and analyzed to generate a reliability prediction for components, subsystems, assemblies, and the like of the vehicle 102.

The vehicle 102 generally includes sensors 110 (e.g., load cells, accelerometers, strain gages, displacement gages, force transducers, thermocouples, profile meters, etc.) that generate data, DATA, related to the terrain, TERR, and other operating and environmental conditions to which the components of the vehicle 102 are exposed. The terrain, TERR, generally results in random inputs to the vehicle 102 (see, for example, FIG. 3, discussed below); however, the terrain, TERR, may provide any appropriate input to the vehicle 102 to meet the design criteria of a particular application.

The data acquisition system 104 is generally electrically coupled to the sensors 110. The data acquisition system 104 generally acquires the data to be analyzed, and transmits the data, DATA, to the data analysis system 106. The data, DATA, may be transmitted wirelessly (as illustrated), via recording and subsequent downloading, or hardwire interconnection.

The data analysis system 106 generally includes a memory 120 where the data, DATA, and appropriate programming may be stored and retrieved, a processor 122 that may implement the programming stored in the memory 120 to analyze the data, DATA, that is stored in the memory 120, and an input/output (I/O) (e.g., printer, display screen, keyboard, mouse, user interface, etc.) 124. The memory 120, the processor 122, and the I/O 124 are generally electrically coupled.

The I/O 124 may provide a user ability to control the operation of the system 100 generally and, in one example, may present the reliability prediction to a user via the data analysis system 106. In other examples, the data, DATA that is processed via the data analysis system 106 may comprise historically acquired data, may comprise simulated data, and may originate from sources other than the vehicle 102 and the data acquisition system 104.

Referring to FIG. 2 (due to the length, generally shown as inter-related FIGS. 2A-2E), a flow diagram illustrating a method (e.g., routine, process, steps, blocks, operation, etc.) 2000 is illustrated. The FIGS. 2A-2E are inter-connected to form the FIG. 2 via linkage descriptors (e.g., T-W) and via reference to blocks or steps of the method 2000. The method 2000 may be implemented in connection with the system 100 generally, and in connection with the data analysis system 106 in particular, e.g., as computer programming in the memory 120 and processing via the processor 122, to generate the desired reliability prediction based on the data, DATA. The reliability prediction is generally presented to the user via the I/O 124. However, the method 2000 may be implemented in connection with any appropriate data and system to generate desired time-dependent reliability predictions. The discussion of the method 2000 may refer to other figures (e.g., FIGS. 3-13) as relevant; however, the discussion below generally refers to steps of the method 2000.

The method 2000 may obtain (i.e., acquire, download, retrieve, etc.) data, DATA (block or step 2010). In one example, the user may measure a sample of random input terrain profile or random input load excitation via operation of the vehicle 102 on the terrain, TERR. Random input load excitation can be measured using, for example, wheel force transducers or accelerometers or other of the sensors 110.

Figure 3:
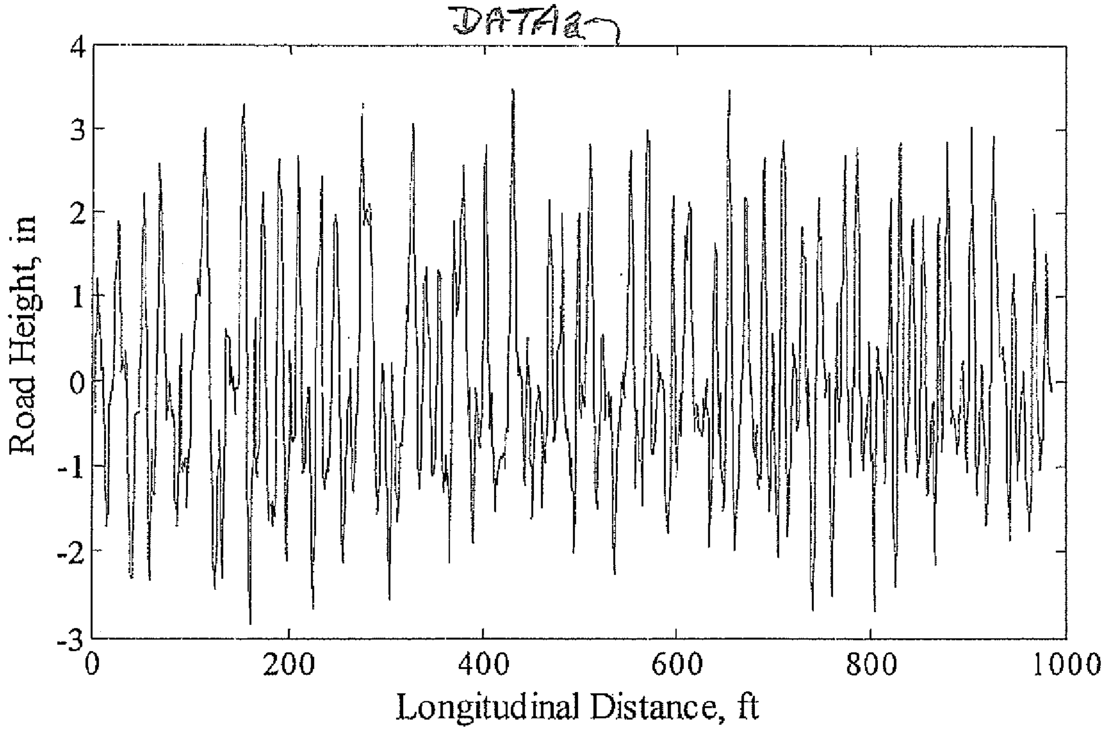
FIG. 3 is a plot of an example of road input data.
Figure 2A:
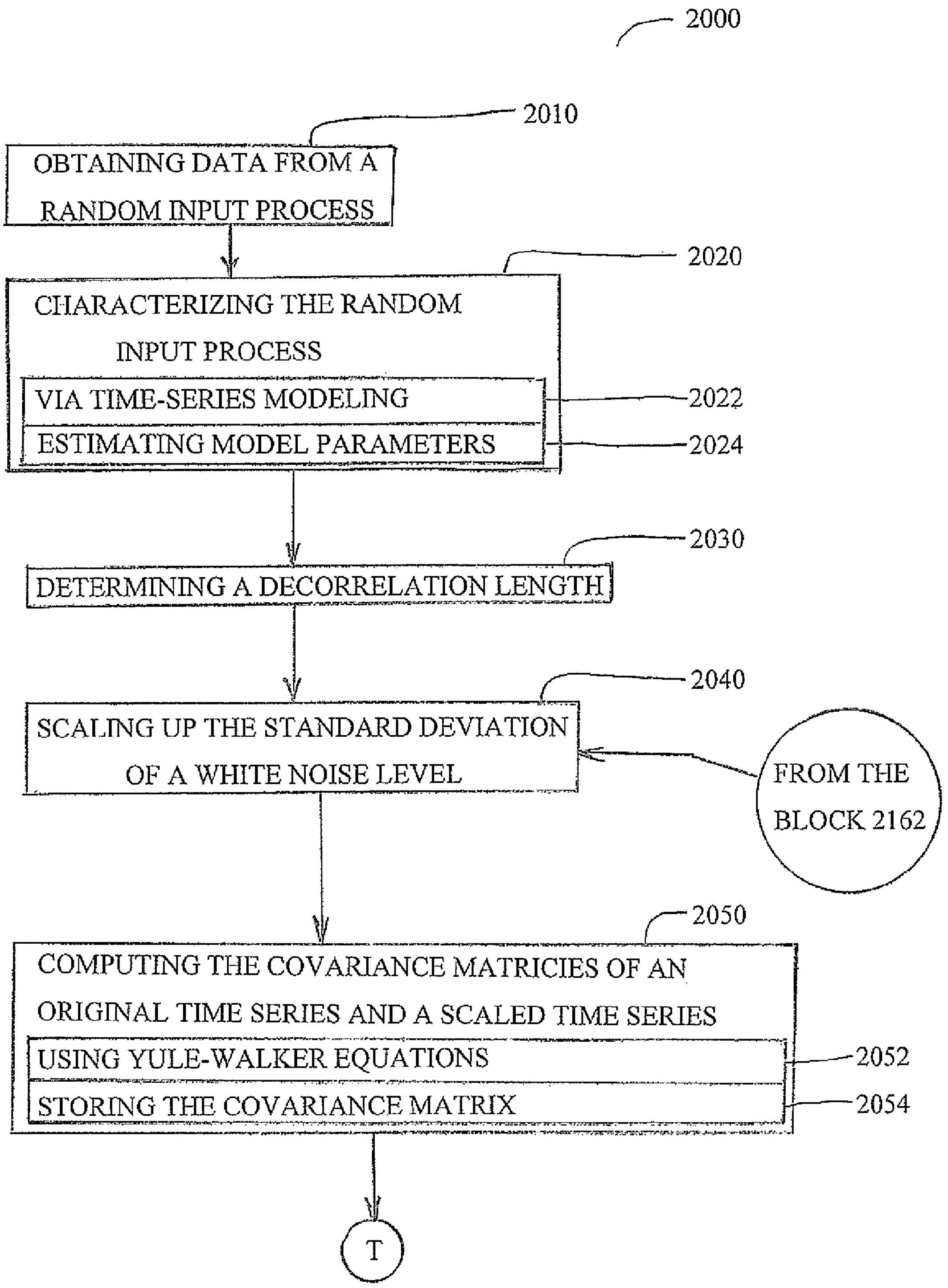
FIG. 2 (shown as inter-related FIGS. 2A-2E) is a flow chart of a method of the present invention that may be implemented via the system of FIG. 1.
Figure 2B:
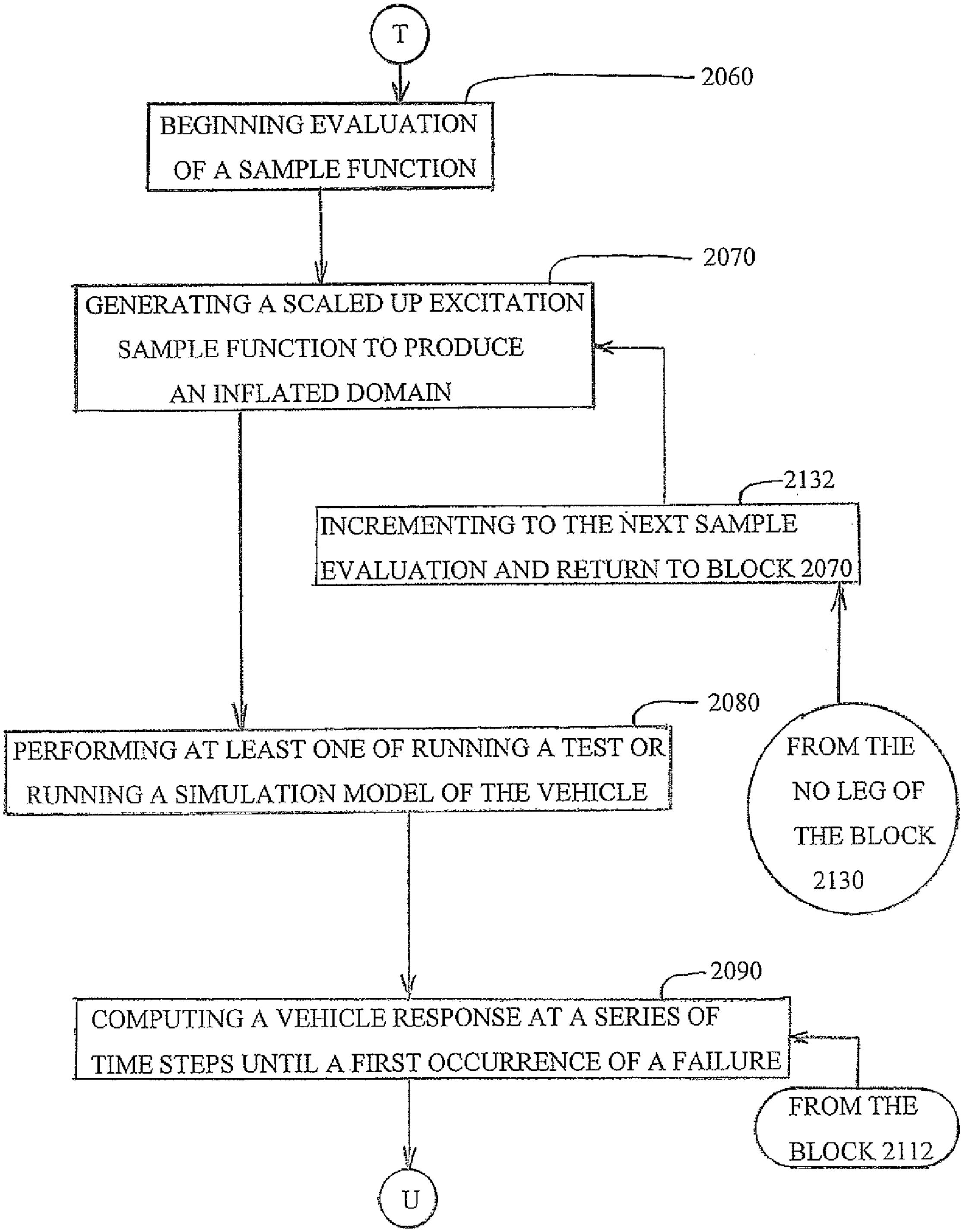
Figure 2C:
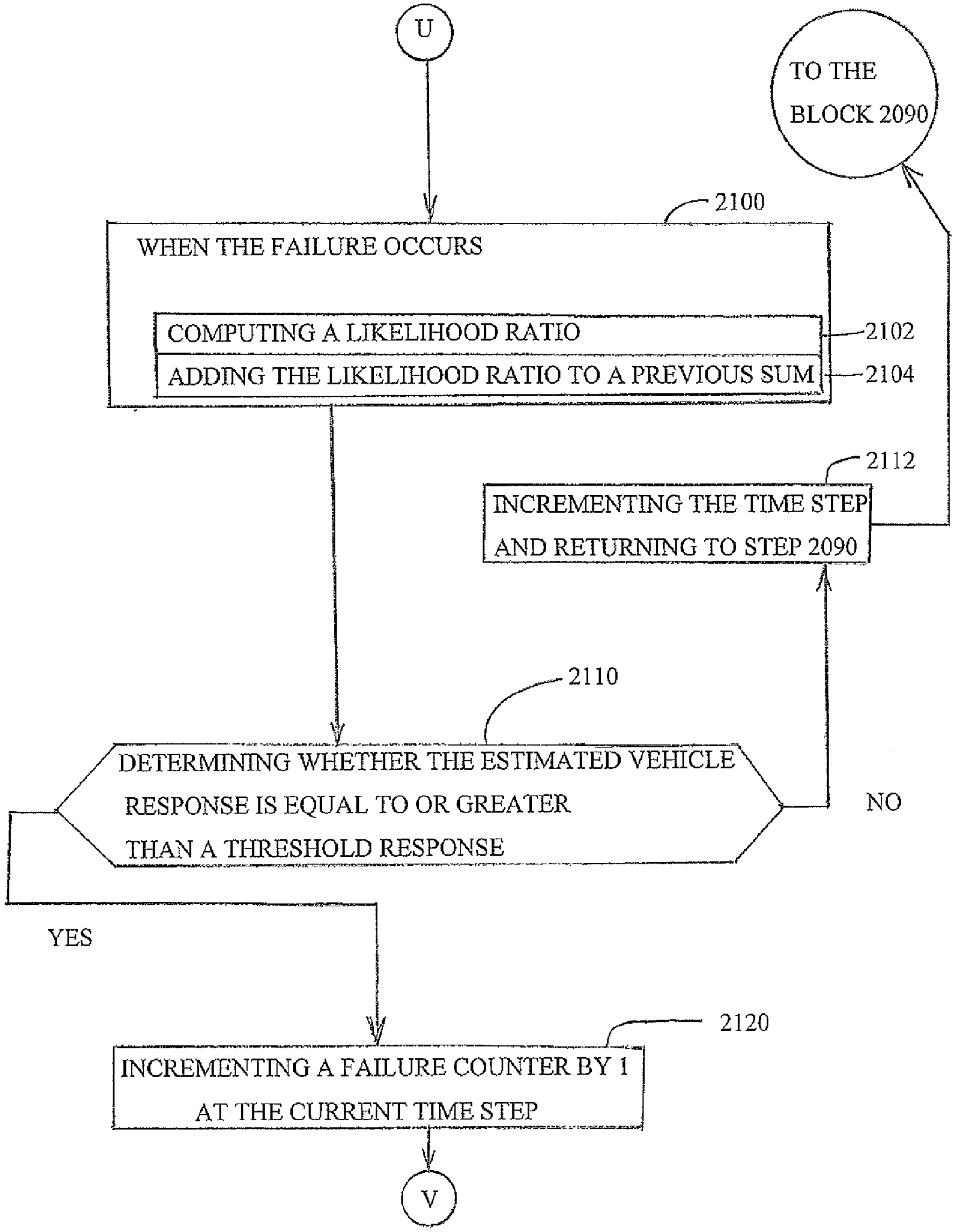
Figure 2D:
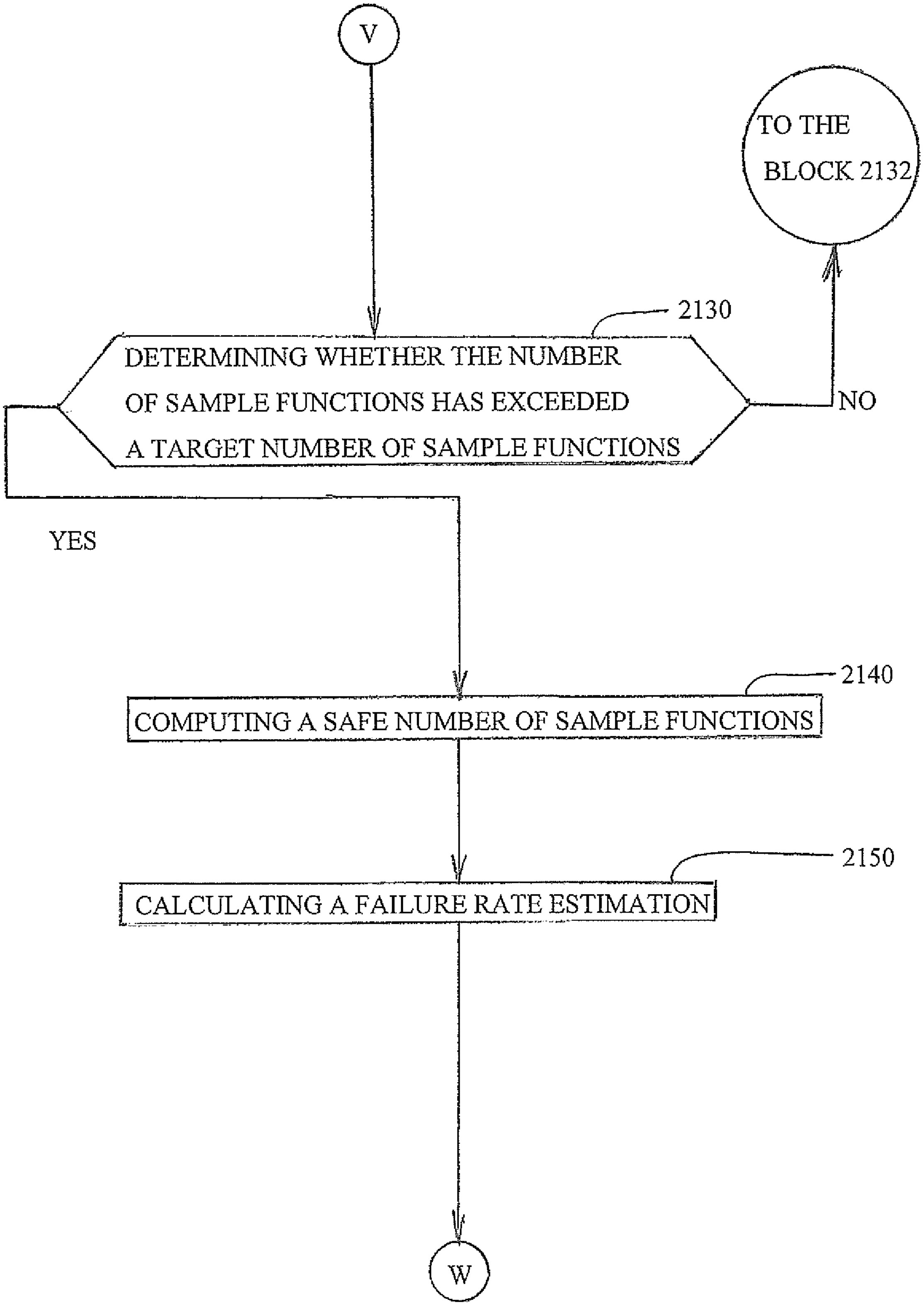
Figure 2E:
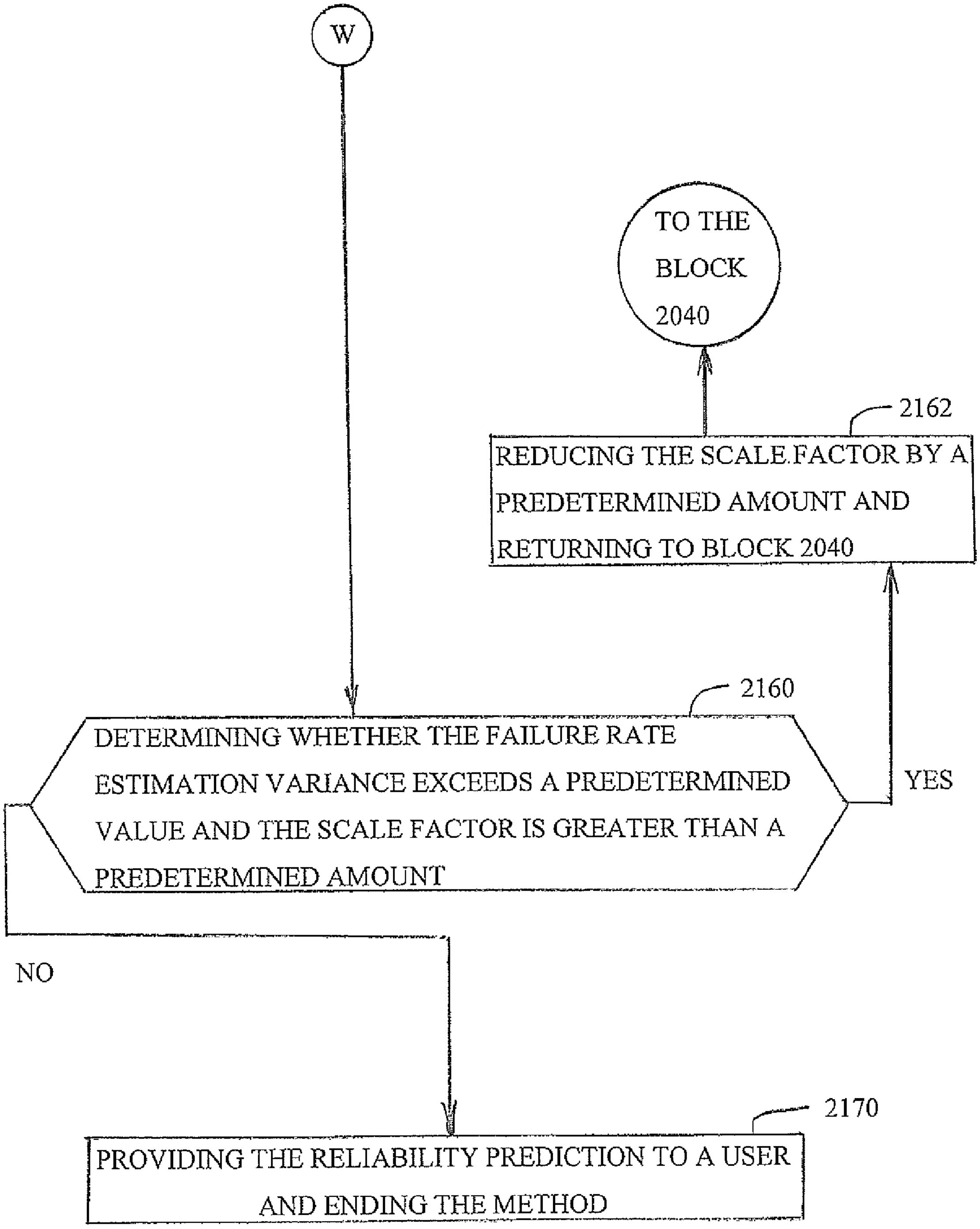

Referring to FIG. 3, a plot that illustrates an example of data (e.g., road height of the terrain, TERR, over a longitudinal distance as traversed by the vehicle 102) that may be used in connection with the method 2000 is shown.

The method 2000 may characterize the original random input process (block or step 2020). The step 2020 comprises sub-blocks or sub-steps 2022 and 2024.

The random input process is generally characterized via time-series modeling (the sub-block or sub-step 2022). In one example, an autoregressive integrated moving average (ARIMA) model may be implemented. As is known to one of skill in the art, when one of the terms is zero, AR, I or MA are usually dropped. For example, an I(1) model is ARIMA(0,1,0), a MA(1) model is ARIMA(0,0,1), and so forth.

For the sub-step 2022, the data, (e.g., DATAa), is considered the result of a random process (e.g., as illustrated on the plot of FIG. 3), e.g., X(t). A sample function x(t) is discretized in the time interval [0, T] using a uniform time step (e.g., index, instant, etc.) Δt so that $x_i=x(t_i)$, where $t_i=i\cdot\Delta t$. For an AR(p) model of order p, the discretized sample function is represented as $$x_i-\mu=\phi_1(x_{i-1}-\mu)+\phi_2(x_{i-2}-\mu)+\dots+\phi_p(x_{i-p}-\mu)+\epsilon_1$$

where μ is the temporal mean of the process, $\epsilon_i \equiv N(0, \sigma_e^2)$ is Gaussian white noise and $\phi_1, \phi_2, \dots \phi_p$ are feedback parameters. All model parameters, $\mu, \sigma_e^2, \phi_1, \phi_2, \dots \phi_p$ are to be estimated.

Estimate the model parameters (the sub-block or sub-step 2024). As understood by one of skill in the art, different order AR models can be generated to determine the best fit. For an AR(p) model, the variance $\sigma_e^2$ of the Gaussian white noise is determined from $$\gamma(0)=\mathrm{Var}(x_i)=\frac{\sigma_e^2}{1-\phi_1\rho_1-\phi_2\rho_2\ \dots\ -\phi_p\rho_p}$$

where γ(0) is the variance of the random process, and $\rho_p$ is the value of the autocorrelation function at time lag $\tau=p\cdot\Delta t$. Similar expressions exist for higher order AR models.

After the feedback parameters are estimated, a residual series $E(t)=x(t)-\hat{x}(t)$ is formed as the difference between the actual x(t) and the estimated $\hat{x}(t)$ processes and statistical tests are performed to make sure that the random variables $E_t$ and $E_{t+\tau}$ are uncorrelated for every τ.

When not known, the appropriate AR model type can be identified by a user by visually inspecting the plots of the autocorrelation and the partial sample autocorrelation functions for different lags (multiples of Δt; see, FIG. 4, discussed below). The autocorrelation provides significant information about the correlation between random variables $X(t_1)$ and $X(t_1+\tau)$ where τ denotes the lag. For a stationary random process, the autocorrelation depends only on τ and not on $t_1$.

For autoregressive models, the autocorrelation function dies out quickly with increasing $\tau$. The sample autocorrelation function $\hat{\rho}(\tau)$ is defined as $$\hat{\rho}(\tau) = \frac{n^{-1}\sum_{i=1}^{n-\tau}(x_{i+\tau}-\mu)(x_i-\mu)}{\hat{\sigma}^2}$$

where $\hat{\sigma}$ is the estimated standard deviation of the random process. In the above equation, an unbiased estimation of $\rho(\tau)$ if is replaced by $(n-h)^{-1}$. For convenience however, the $n^{-1}$ term may be implemented.

The partial autocorrelation of lag h represents the autocorrelation between $X_i$ and $X_{i+\tau}$ with the linear dependence of $X_{i+1}$ through $X_{i+\tau 1}$ removed. The partial autocorrelation is representative of the autocorrelation between $X_i$ and $X_{i-\tau}$ that is not accounted for by lags 1 to $\tau-1$, inclusive. The partial autocorrelation is generally useful in identifying the order of an autoregressive model. For an AR(p) model, it is zero for lags greater or equal to p+1. After the order p of the model is identified, the $\phi$'s and $\mu$ are estimated either by using the Yule-Walker equations or alternatively, by minimizing $$\sum_{i=p+1}^{n}[(x_i-\mu)-\phi_1(x_{i-1}-\mu)-\ldots-\phi_p(x_{i-p}-\mu)]^2$$

Statistical tests may be performed to ensure the goodness of fit. When the data, DATA, includes results from a known environment terrain, TERR; using an AR(3) (e.g., where ARIMA is used for p=3) autoregressive time-series model may represent the random road process. For the example shown, the following three parameters of the model $$\phi_1=1.2456, \phi_2=-0.2976, \phi_3=-0.1954$$

were estimated. The standard deviation $\sigma_\epsilon=0.5132$ of the zero-mean residual process, $\epsilon_i$ was also estimated. The AR(3) model is then expressed as $$\mu_i=1.2456u_{i-t}-0.2976u_{i-2}-0.1954u_{i-3}+\epsilon_i(0,0.5132^2)$$

Figure 4:
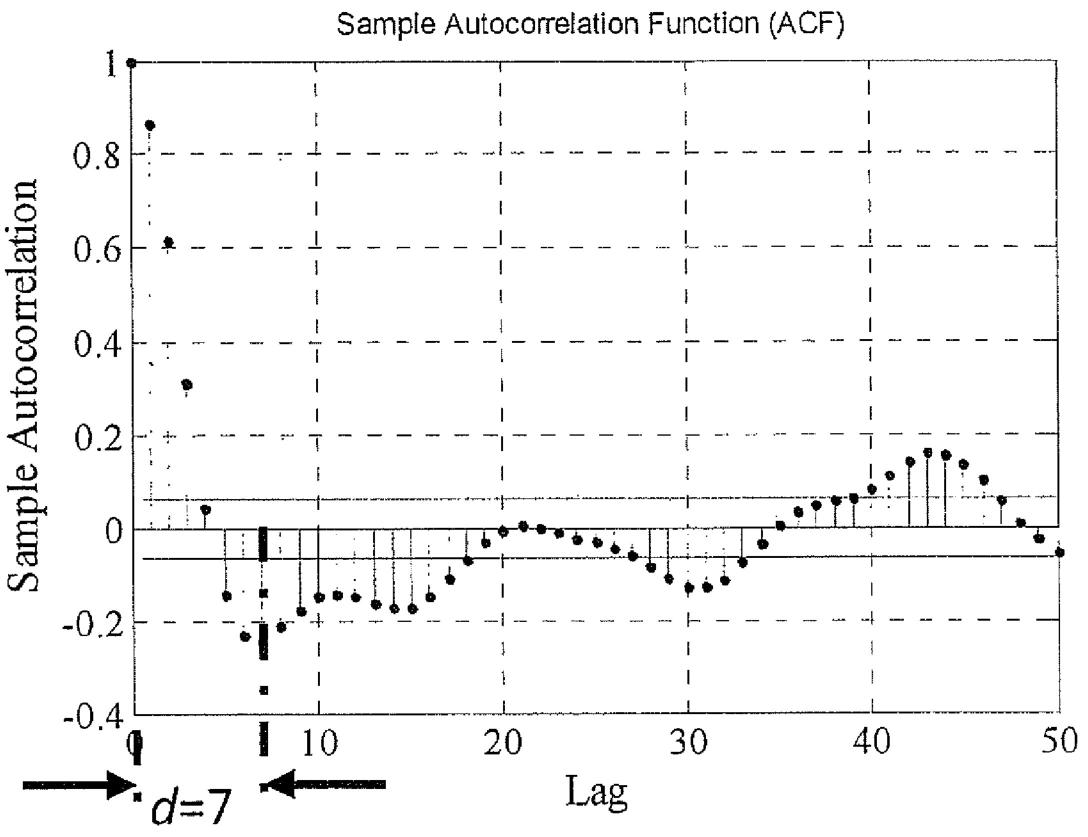
FIG. 4 is a plot of an example of auto correlation values versus time lag.

Referring to FIG. 4, a diagram that illustrates a plot of an example of an autocorrelation function, and the determination of an appropriate decorrelation length. The decorrelation length generally influences the accuracy and efficiency of the importance sampling method. The decorrelation length generally determined such that large enough so that the correlation between $X_i=X(t_i)$ and $X_{i-d}=X(t_{i-d})$ is relatively small. However, the variance of the likelihood ratio (discussed below in connection with step or block 2100) generally increases with increasing decorrelation length, resulting in an undesirable increase in the variance of the estimated failure rate. Thus, a value of d is generally determined based on the tradeoff between accuracy of the importance sampling method and computational efficiency.

For a stationary process, the autocorrelation function generally decays rapidly, either exponentially or by overshooting into the negative region before settling down. When the autocorrelation function decay is exponential, all of the feedback parameters are generally positive, the number of feedback parameters may be sufficient to estimate the shape of the autocorrelation function. Therefore, a decorrelation length d=p which is equal to the order of the AR(p) model may be implemented because the partial autocorrelation function generally becomes insignificant after p lags.

When the autocorrelation function overshoots the zero axis, the oscillations with increasing lag generally indicate that there is at least one negative feedback parameter. Depending upon which feedback parameter is negative, the shape of the autocorrelation function can vary (change). As such, the shape of autocorrelation function is generally not determined based only on the order of the AR(p) model.

In the case illustrated on FIG. 4, a decorrelation length, d, which is at least equal to the number of lags from zero to the point the autocorrelation function (ACF) reaches the minimum value. For example, for a measured terrain input, as shown in FIG. 4, the autocorrelation function of the input random process indicates that the minimum value is reached after seven lags. Therefore, a decorrelation length of d=7 is implemented.

Scale-up the standard deviation of the white noise to generate an inflated input domain (block or step 2040). The standard deviation of the white noise $\epsilon^s=N(0, \sigma_s^2)$ as $\sigma_s=f\sigma_e$ is generally scaled up such that $f\approx1.2$ to 1.5 to generate an inflated random input excitation using the time-series model. Generally as a first estimate, implement as the upper value, f=1.5.

Compute the covariance matrix of the input time-series (block or step 2050). The step 2050 comprises sub-blocks or sub-steps 2052 and 2054. Yule-Walker equations may be implemented to compute the covariance matrix of both original ($\Sigma$) and sampling distribution ($\Sigma_S$) (sub-step 2052) using the correlation coefficients from the equation below.

$$\rho_m = \sum_{q=1}^{p}\phi_q\rho_{m-q}$$

where m=1, 2 . . . k and $\rho_m$ is the correlation coefficient at lag m.

Store the covariance matrix in the memory 120 of the computer or data base 106, for later retrieval (sub-step 2054).

The terrain or the random process input analysis has been completed. Evaluation of response of the vehicle 102 to the input is generally conducted next.

Set a first sample function evaluation, N=1 (block or step 2060).

Generate a scaled-up input excitation sample function (block or step 2070). Implement the previously calculated scaled-up standard deviation, $\sigma_s$ of the time-series model. By scaling-up the road excitation, an inflated sampling distribution may be generated (i.e., produced, calculated, etc.), which generally produces a large number of first-passage failures. The large number of first-passage failures generally advantageously decreases the required number of samples without sacrificing accuracy when compared to conventional approaches.

The scaled-up excitation sample function then becomes:

$$x_i-\mu=\phi_1(x_{i-1}-\mu)+\phi_2(x_{i-2}-\mu)+\ldots+\phi_p(x_{i-p}-\mu)+\epsilon_i$$

where $\mu$ is the temporal mean of the process, $\epsilon_i\equiv N(0,\sigma_s^2)$ The step 2070 is generally similar to the step 2020; however, generally implemented with the higher standard deviation, $\sigma_s=f\sigma_e$ (from the step 2040) of the Gaussian white noise, $\epsilon_i\equiv N(0,\sigma_s^2)$ (from the step 2020) while keeping all other estimated parameters same as in the step 2020.

Conduct (e.g., run, perform, etc.) a test (see discussion in connection with FIG. 5) or a simulation model (see discussion in connection with FIG. 6) of the vehicle 102 implementing the scaled up road excitation that was determined via the step 2070 (block or step 2080).

Figure 5:
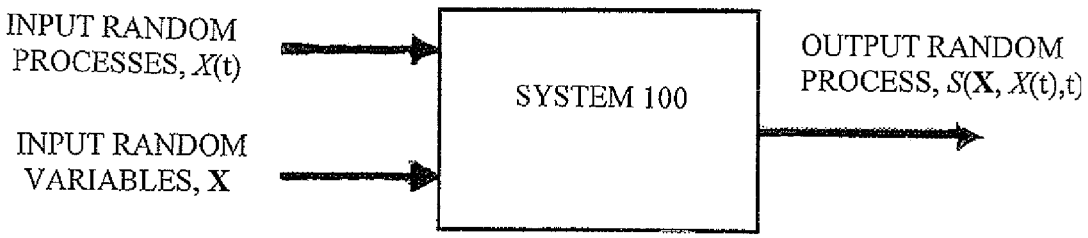
FIG. 5 is a block diagram of the response process implemented via the method of FIG. 2 is illustrated.

Referring to FIG. 5, a block diagram of the generally system 100 response process implemented via the method 2000 through step 2070 is illustrated when a test is conducted (e.g., ran, made, etc.) in connection with the vehicle 102.

The test process as illustrated on FIG. 5 may represent the vehicle 102 going over the terrain, TERR, (for one example, typical vehicle proving grounds courses) with the particular vehicle 102 of interest.

Figure 6:
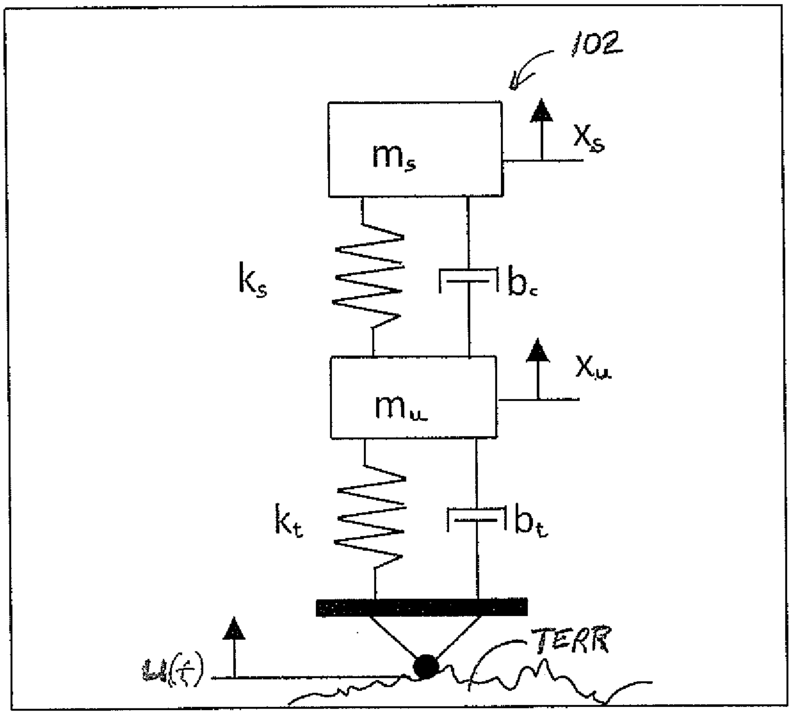
FIG. 6 is an embodiment of a simulation of a quarter car.

Referring to FIG. 6, alternatively, the component response can be simulated such as by finite element analysis, multi-body simulation codes, or the like. An embodiment of such a simulation has been demonstrated through a quarter car example (e.g., the simulation of FIG. 6) on the surface of a typical vehicle proving ground course.

In the simulation embodiment of FIG. 6, the vehicle 102 travels over the stochastic terrain, TERR, at a speed of 70 mph. The random input vector X comprises two random variables and a random process u(t) that generally represent the road excitation. A damping coefficient $b_s$ and a stiffness $k_s$ are the two random variables. The damping coefficient $b_s$ and the stiffness $k_s$ are both normally distributed with $b_s$~N(7000, $1400^2$) N/m/s and $k_s$~N($40\times10^3$, $(4\times10^3)^2$) N/m. A fixed parameter vector d includes sprung and unsprung masses, $m_s$ and $m_u$, respectively; a tire stiffness, $k_t$; and a tire damping, $b_t$; where, in the embodiment described, $m_s$=1000 Kg, $m_u$=100 Kg, $k_t=40\times10^4$ N/m, and $b_t=4\times10^3$ N/m/s.

Figure 7:
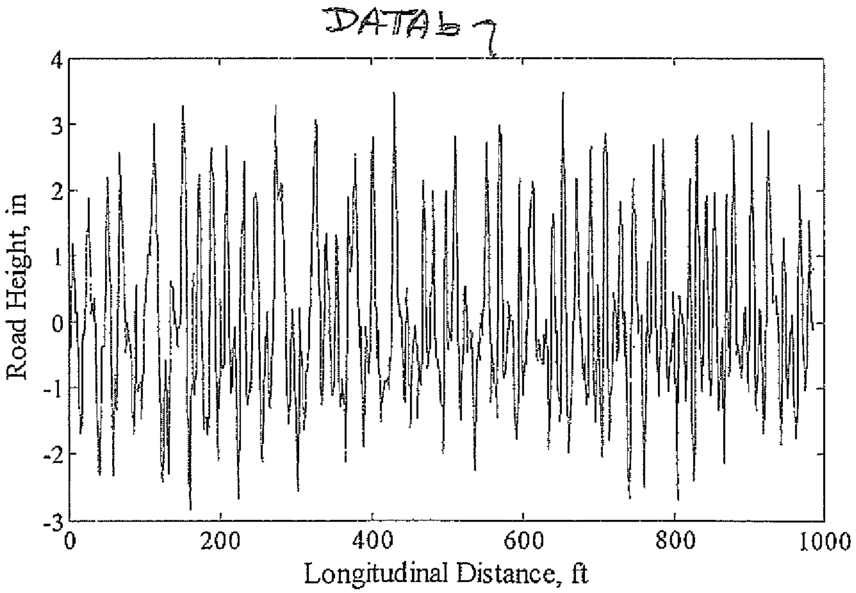
FIG. 7 is a plot of another example of road data.

Referring to FIG. 7, a section of the stochastic terrain, TERR, for an experimental road as implemented in the example analysis performed via the method 2000 is illustrated (e.g., DATAb).

Compute the vehicle response, $S^s(t_i)$ at every time step until the first occurrence of the failure i.e. $S^s(t_i)\geq S_{threshold}$ where $S_{threshold}$ is the maximum acceptable level of the response (block or step 2090). The vehicle response $S^s(t_i)$ may be such as vehicle acceleration, stress or strain in the component.

Figure 8:
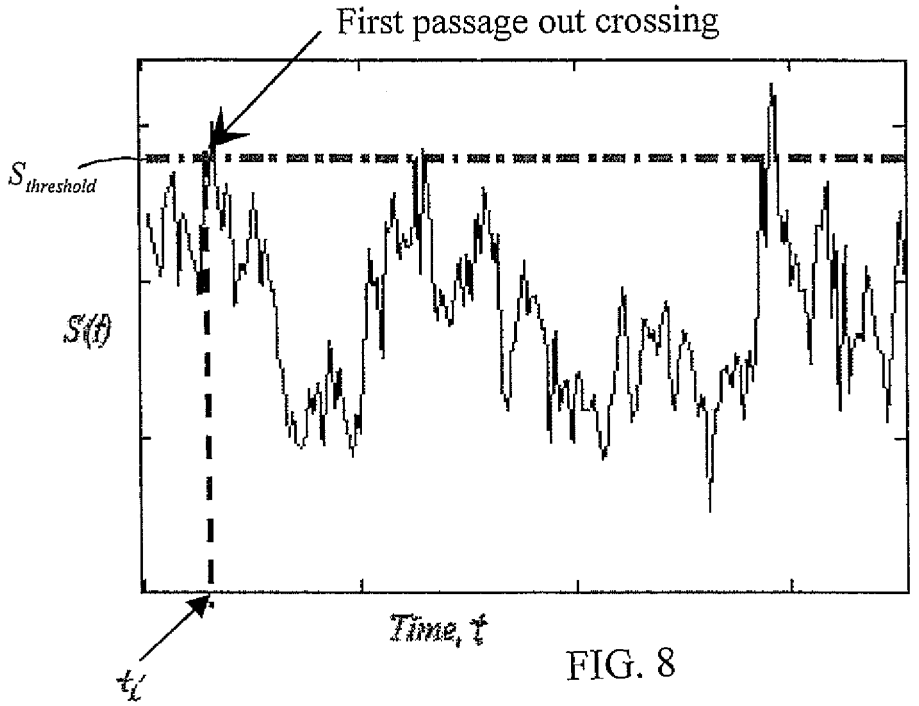
FIG. 8 is a plot that illustrates the first-passage failure condition of a response.

Referring to FIG. 8, a plot that illustrates the first-passage failure condition of a response is shown. First passage out-crossings may occur at any time, $t_i$. The test for a particular vehicle of interest that is represented as the vehicle 102 going over the terrain, TERR, (e.g., a vehicle proving ground) is described below in connection with FIGS. 8-10. Vehicle vertical acceleration is plotted as the response.

Figure 9:
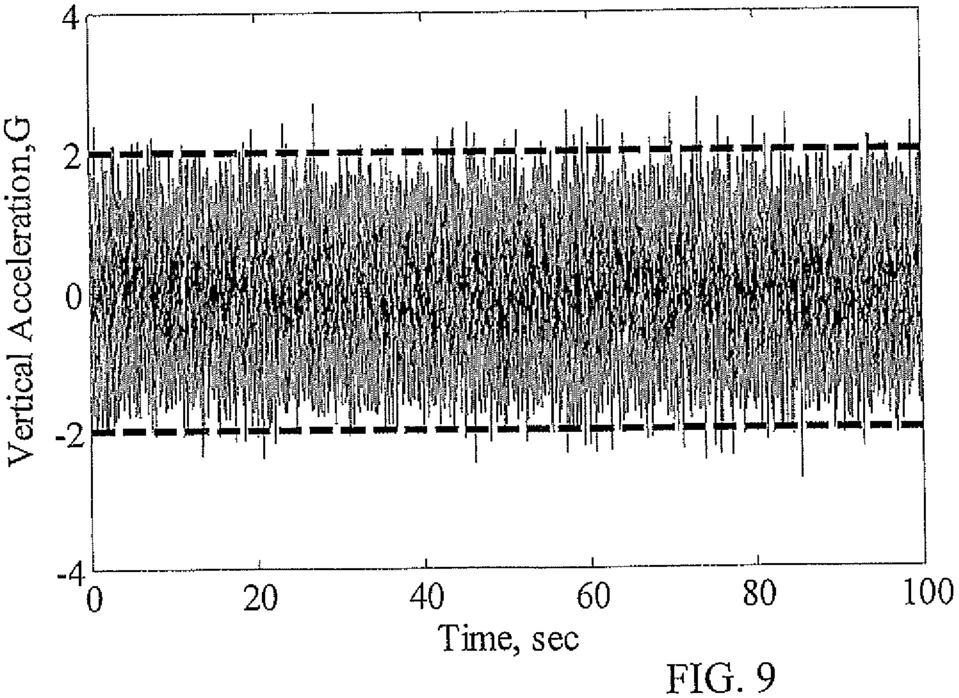
FIGS. 9 and 10 are plots of sample function realizations of a vertical acceleration random process.

Referring to FIG. 9, a plot of the sample function realizations of the vertical acceleration random process from the previously estimated standard deviation $\sigma_e$=0.51 of the residual process is shown. For the given condition, failure generally occurs when the magnitude of the vertical acceleration exceeds 2 G; i.e. g(2−|S(t)|)<0. For the sampling distribution, a higher standard deviation $\sigma_s$=0.7 of the residual process is implemented.

Figure 10:
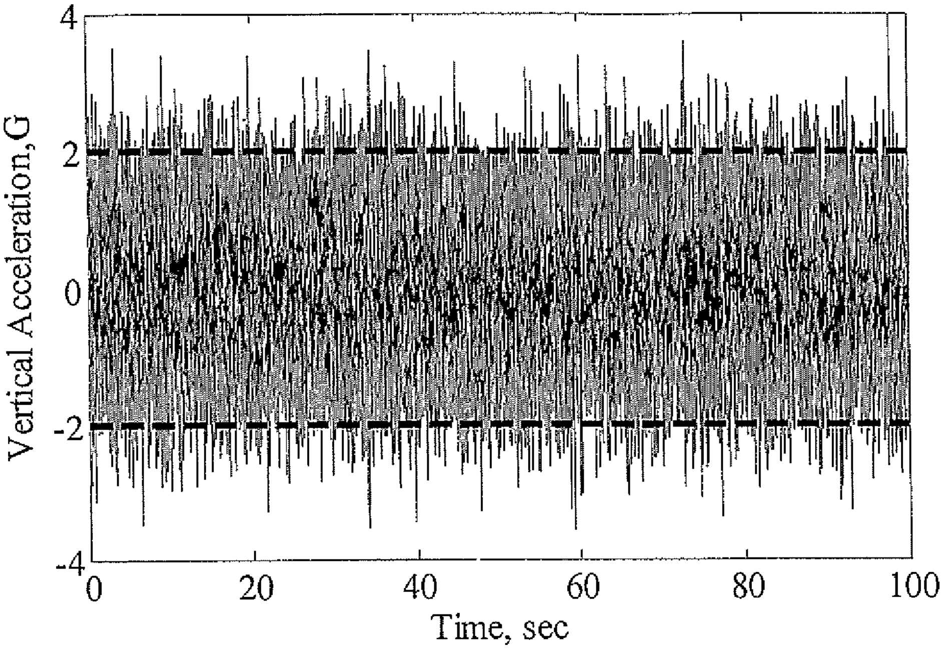

Referring to FIG. 10, a plot illustrating sample functions of the vertical acceleration random process which are generated using the sampling distribution indicating that more failures (i.e., out-crossings greater than 2 G) are induced is shown.

When a failure occurs, compute the Likelihood Ratio (block or step 2100). The step 2100 may include sub-steps (or sub-blocks) 2102 and 2104.

Likelihood Ratio (e.g., the sub-step 2102):

$$\omega(x, t_i) = \frac{f_X(x; t_i)}{f_X^S(x; t_i)} = \frac{f_X(x_i, x_{i-1}, \ldots, x_{i-d})}{f_X^S(x_i, x_{i-1}, \ldots, x_{i-d})}$$

where

The joint density $f_X(x)$ is calculated using the k=d+1 normal random variables of the random vector X={$x_1$, $X_{i-1}$, . . . , $X_{i-d}$} as, $$f_X(x) = \frac{1}{(2\pi)^{k/2}|\Sigma|^{1/2}}\exp\left(-\frac{1}{2}(x-\mu)^T\Sigma^{-1}(x-\mu)\right)$$

where μ={$\mu_i$, $\mu_{i-1}$ . . . $\mu_{i-d}$}={$\bar{x}\,\bar{x}$ . . . $\bar{x}$} is the mean vector of the random vector X with all mean values equal to the mean value $\bar{x}$ of the random process, and Σ is the covariance matrix computed in the step 2050.

Similarly, the sampling density is given by $$f_X^S(x) = \frac{1}{(2\pi)^{k/2}|\Sigma^S|^{1/2}}\exp\left(-\frac{1}{2}(x-\mu^S)^T[\Sigma^S]^{-1}(x-\mu^S)\right)$$

where $\mu^S$ and $\Sigma^S$ are the mean vector and the covariance matrix associated with the inflated random input vector.

The likelihood ratio is added to the previous sum at the given time instant (e.g., the sub-step 2104) as:

$$\sum_1^N \omega(x, t_i).$$

Determine whether the condition $$\frac{\sigma_e}{\sigma_S}x_f > S_{threshold}$$

is satisfied, where $x_f$ is the value of an inflated response at failure (decision block or step 2110).

The safe sample functions are generally calculated from the original environment so that more safe sample functions remain in the population at later times. The condition of safe sample functions remaining in the population is generally achieved by discarding a sampling sample function only when the condition $$\frac{\sigma_e}{\sigma_S}x_f > S_{threshold}$$

is satisfied, where $x_f$ is the value of an inflated response at failure. The response in the original environment may be approximated by scaling down the inflated response using the ratio of original and sampling standard deviations of the residual process.

When the sample function is not discarded (i.e., the NO leg of the decision block 2110), the time is incremented by one step (block or step 2112); and the likelihood ratio is again computed for the next occurrence of the failure (i.e., the step 2090 is again performed). The steps 2090, 2100, and 2110 may be repeated until the sample function is discarded or until last time step in the data, DATA, is reached (completed).

When the sample function is discarded, the next (subsequent) sample function is generally evaluated from step 2070 onwards.

When the sample function is discarded (i.e., the YES leg of the decision block 2110), increment number of failures by 1 at the given time step (block or step 2120):

Failure counter, $N_f(t_i)=N_f(t_i)+1$, where the failure counter is generally an approximation of the number of failures in the original (i.e., not scaled up) domain.

Determine whether the number of sample functions has exceeded a target number of sample function evaluations (decision block or step 2130). When the number of sample functions has not exceeded the target number of sample function evaluations (i.e., the NO leg of the decision block 2130), increment to the next sample evaluation (block or step 2132), and return to step 2070. When the number of sample functions has exceeded the target number of sample function evaluations (i.e., the YES leg of the decision block 2130), compute the safe number of sample functions $N_S$ (block or step 2140).

The safe number of sample functions $N_S$ is generally computed at every step 2140 by subtracting the failed number of samples from the previous safe number of sample functions:

$$N_s(t_{i-1}) = N - \sum_{t=t_{min}}^{t_{i-1}} N_f(t)$$

Estimate First Passage Failure Rate (block or step 2150). Estimated first passage failure rate, $$\lambda(t_i) = \lim_{\Delta t \to 0} \frac{\sum_{n=1}^{N_f(t_i)} \omega(x, t_i)}{\Delta t \cdot N_S(t_{i-1})}$$

Determine whether the variance in the estimated failure rate exceeds a predetermined value (e.g., a predetermined variance) and the scale factor is greater than a predetermined scale factor (in the example described, f>1.2) (decision block or step 2160). When the variance in the estimated failure rate exceeds the predetermined value and the scale factor is greater than the predetermined scale factor (i.e., the YES leg of the decision block 2160), reduce the scale factor by a predetermined amount (e.g., for the example described, 0.1) (block or step 2162), and return to the block 2040.

When the variance in the estimated failure rate does not exceed the predetermined value and the scale factor is greater than the predetermined scale factor (i.e., the NO leg of the decision block 2160), provide the reliability prediction to the user (block or step 2170), and end the process 2000 (block or step 2180).

Figure 11:
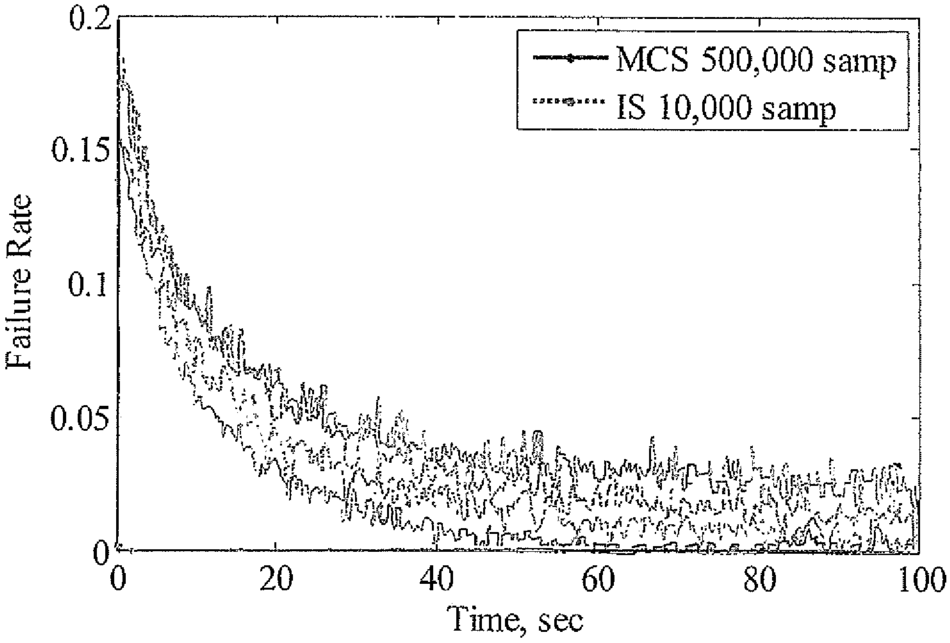
FIGS. 11-13 are plots of comparisons of analyses conducted via a conventional approach and analyses conducted via the method of FIG. 2.
Figure 12:
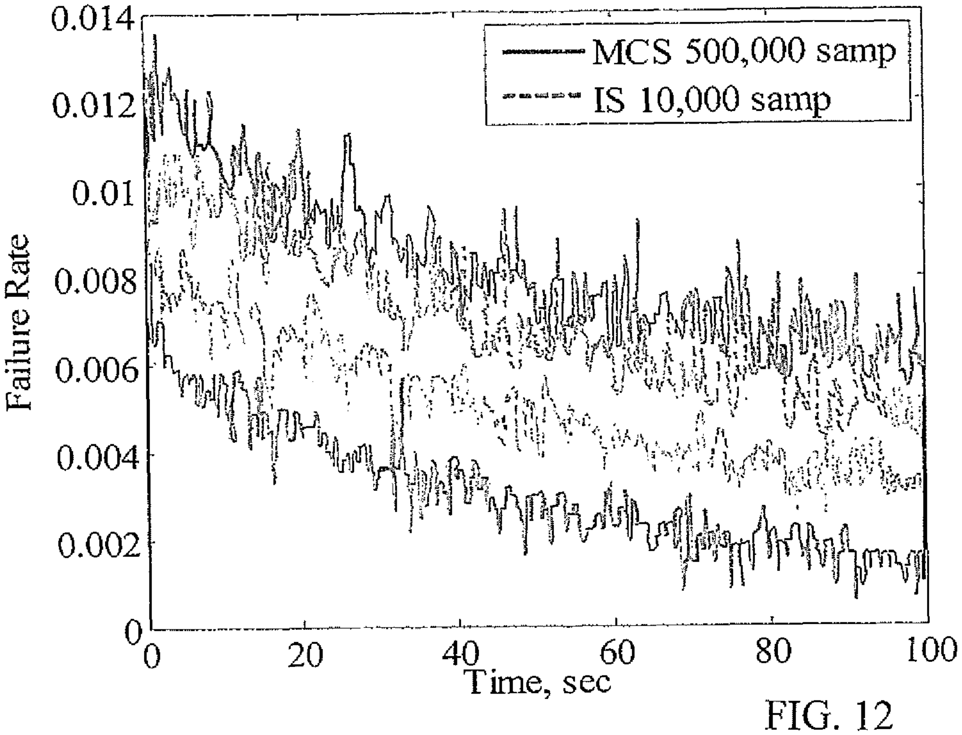
Figure 13:
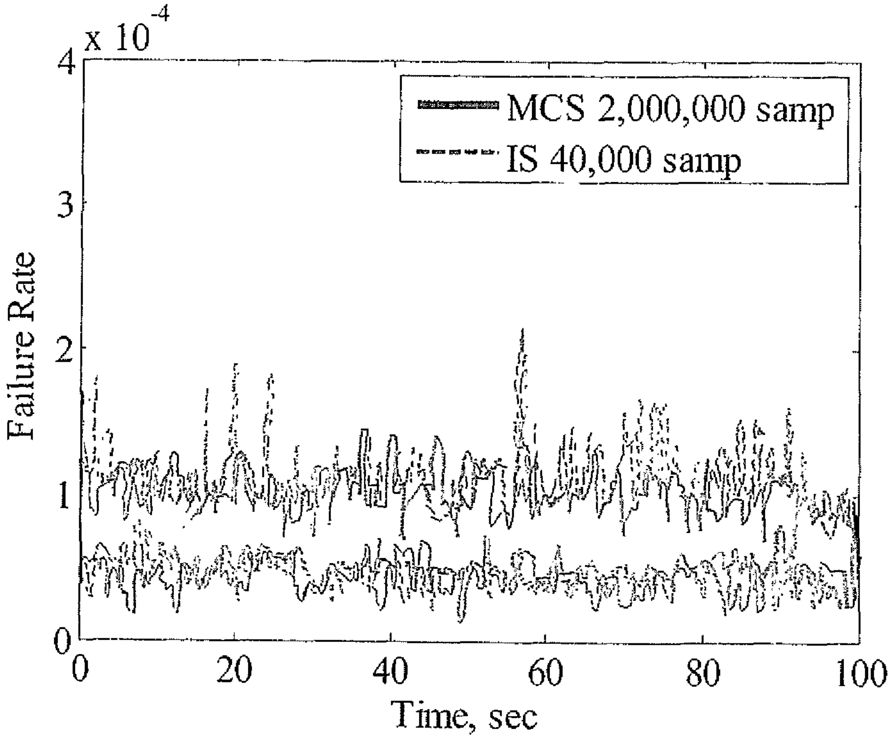

The embodiment demonstrated through reliability prediction analysis via the method 2000 of the quarter vehicle example of FIG. 6 on a typical military vehicle proving ground course, where the vehicle 102 travels over a stochastic terrain, TERR, at the speed of 20 mph is shown on FIGS. 11-13. On FIGS. 11-13, for clarity of illustration, only high and low peak value envelopes of the waveforms are shown.

Referring to FIG. 11, a graph (plot) that illustrates a comparison of a Monte Carlo Simulation (MCS) based failure rate implemented with 500,000 sample functions to the failure rate obtained from the importance sampling (IS) method 2000 implemented with 10,000 sample functions at the vehicle threshold response of 2 G is shown. Note that the failure rates calculated by the importance sampling method 2000 and the MCS based method are similar. However, the method 2000 was implemented with a small fraction of the number of samples required by the MCS method for similar accuracy. As such, the method 2000 may be more computationally efficient and less costly when compared to the MCS method.

Similar accuracy levels are also demonstrated for the higher vehicle threshold response of 2.65 G (see, FIG. 12); and 3.5 G (see, FIG. 13).

As is apparent then from the above detailed description, the present invention may provide an improved system 100 and an improved method 2000 for generating a reliability prediction for components of a vehicle. The method 2000 includes implementing importance sampling in dynamic vehicle systems when the vehicle (e.g., the vehicle 102) is subjected to time-dependent random terrain input (e.g., the terrain, TERR).

Other example systems that may advantageously implement the method 2000, may include any appropriate time-dependent random input data having a large number of data points to consider when making a prediction. Such examples may include finance, econometrics, and bio-medical engineering, and the like.

Various alterations and modifications will become apparent to those skilled in the art without departing from the scope and spirit of this invention and it is understood this invention is limited only by the following claims.

What is claimed is:

1. A system for generating a reliability prediction for components of a vehicle, the system comprising:

sensors electrically coupled to a data acquisition system for obtaining data related to the components from a random input process; and a data analysis system, wherein the data analysis system comprises a computer processor electrically coupled to a computer memory, and the computer memory includes programming for the computer processor to perform the steps (2000) of:

(A) (2010) retrievably storing the data in the computer memory;

(B) (2020) characterizing the random input process, wherein the step of characterizing the random input process further comprises time series modeling of the data, generating an autoregressive integrated moving average (ARIMA) model of the data, estimating feedback parameters of the data, and estimating a standard deviation of white noise of the data;

(C) (2030) determining a decorrelation length;

(D) (2040) scaling up the standard deviation of the white noise of the data;

(E) (2050) computing a covariance matrix of an original time series and of a scaled time series;

(F) (2060) beginning evaluation of a sample function;

(G) (2070) generating a scaled up sample function wherein, a scale factor in the range of 1.2 to 1.5 is implemented to inflate the standard deviation of the white noise of the data to produce an inflated domain;

(H) (2080) performing at least one of running a test or running a simulation model of the vehicle to generate the data;

(I) (2090) computing a scaled vehicle response in response to the inflated domain at a series of time steps until a first occurrence of a failure;

(J) (2100) when the failure occurs, (2102) computing a likelihood ratio based on an original joint probability density function and a sampling joint probability density function, and further comprising (2104) adding the likelihood ratio to a sum of the previous likelihood ratios;

(K) (2110) determining whether the scaled vehicle response is equal to or greater than a threshold response, and (i) when the scaled vehicle response is not equal to or greater than the threshold response, (2112) incrementing the time step and returning to the step (I), and alternatively, (ii) when the scaled vehicle response is equal to or greater than the threshold response;

(L) (2120) incrementing a failure counter by 1 at the current time step to generate a number of the sample functions;

(M) (2130) determining whether the number of the sample functions has exceeded a target number of sample functions and when the target number of sample functions is not exceeded, (2132) incrementing to the next sample evaluation and returning to the step (G), and alternatively, when the target number of sample functions is exceeded;

(N) (2140) computing a safe number of the sample functions, wherein the safe number of the sample functions comprises the number of sample functions minus the number of the sample functions that has exceeded the target number of sample functions;

(O) (2150) calculating a failure rate estimation in response to the safe number of the sample functions and the sum of the previous likelihood ratios; and (P) (2160) determining whether variance of the failure rate estimation exceeds a predetermined estimation variance value and the scale factor is greater than a predetermined scale factor amount, and when the variance of the failure rate estimation exceeds the predetermined estimation variance value and the scale factor is greater than the predetermined scale factor amount, (2162) reducing the scale factor by a predetermined scale factor reduction amount and returning to the step (D), and alternatively, when the variance of the failure rate estimation exceeds the predetermined estimation variance value;

(Q) (2170) providing the failure rate estimation as the reliability prediction to a user, and ending the method.

2. The system of claim 1 wherein, the covariance matrix is computed via Yule-Walker equations.

3. The system of claim 1, the step (E) further comprising (2054) a sub-step of storing the covariance matrix in the computer memory.

4. A method (2000) of generating a reliability prediction for components of a vehicle, the method comprising the steps of:

(A) (2010) obtaining data related to the components from a random input process and retrievably storing the data in a computer memory, and via programming stored in the computer memory implementing a computer processor to perform the steps of:

(B) (2020) characterizing the random input process, wherein the step of characterizing the random input process further comprises time series modeling of the data, generating an autoregressive integrated moving average (ARIMA) model of the data, estimating feedback parameters of the data, and estimating a standard deviation of white noise of the data;

(C) (2030) determining a decorrelation length;

(D) (2040) scaling up the standard deviation of the white noise of the data;

(E) (2050) computing a covariance matrix of an original time series and of a scaled time series;

(F) (2060) beginning evaluation of a sample function;

(G) (2070) generating a scaled up sample function wherein, a scale factor in the range of 1.2 to 1.5 is implemented to inflate the standard deviation of the white noise of the data to produce an inflated domain;

(H) (2080) performing at least one of running a test or running a simulation model of the vehicle to generate the data;

(I) (2090) computing a scaled vehicle response in response to the inflated domain at a series of time steps until a first occurrence of a failure;

(J) (2100) when the failure occurs, (2102) computing a likelihood ratio based on an original joint probability density function and a sampling joint probability density function, and further comprising (2104) adding the likelihood ratio to a sum of the previous likelihood ratios;

(K) (2110) determining whether the scaled vehicle response is equal to or greater than a threshold response, and (i) when the scaled vehicle response is not equal to or greater than the threshold response, (2112) incrementing the time step and returning to the step (I), and alternatively, (ii) when the scaled vehicle response is equal to or greater than the threshold response;

(L) (2120) incrementing a failure counter by 1 at the current time step to generate a number of the sample functions;

(M) (2130) determining whether the number of the sample functions has exceeded a target number of sample functions and when the target number of sample functions is not exceeded, (2132) incrementing to the next sample evaluation and returning to the step (G), and alternatively, when the target number of sample functions is exceeded;

(N) (2140) computing a safe number of the sample functions, wherein the safe number of the sample functions comprises the number of sample functions minus the number of the sample functions that has exceeded the target number of sample functions;

(O) (2150) calculating a failure rate estimation in response to the safe number of the sample functions and the sum of the previous likelihood ratios; and (P) (2160) determining whether variance of the failure rate estimation exceeds a predetermined estimation variance value and the scale factor is greater than a predetermined scale factor amount, and when the variance of the failure rate estimation exceeds the predetermined estimation variance value and the scale factor is greater than the predetermined scale factor amount, (2162) reducing the scale factor by a predetermined scale factor reduction amount and returning to the step (D), and alternatively, when the variance of the failure rate estimation exceeds the predetermined estimation variance value;

(Q) (2170) providing the failure rate estimation as the reliability prediction to a user, and ending the method.

5. The method of claim 4 wherein, the covariance matrix is computed via Yule-Walker equations.

6. The method of claim 4, the step (E) further comprising (2054) a sub-step of storing the covariance matrix in the computer memory.

* * * * *